Sept. 12, 1967   J. O. POISSON   3,340,820
CONVEYOR SYSTEM
Filed May 13, 1965   3 Sheets-Sheet 1

INVENTOR
Joseph O. POISSON
BY
ATTORNEYS

INVENTOR
Joseph O. POISSON
BY
ATTORNEYS

Sept. 12, 1967 J. O. POISSON 3,340,820
CONVEYOR SYSTEM
Filed May 13, 1965 3 Sheets-Sheet 3
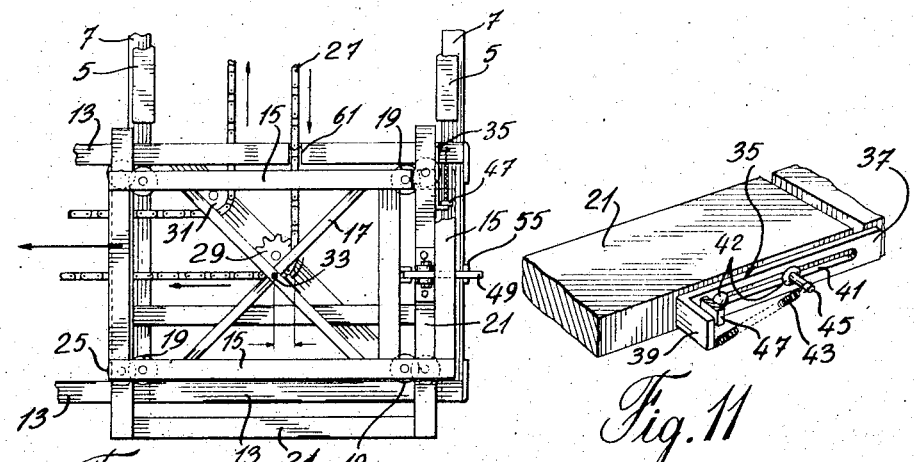
Fig. 5
Fig. 11
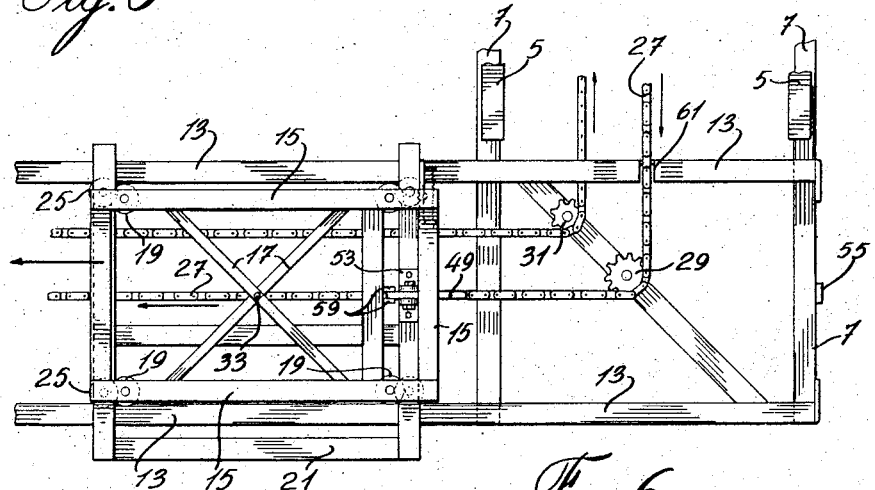
Fig. 6
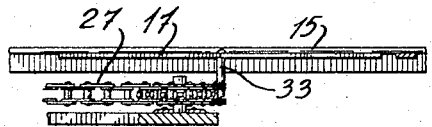
Fig. 7
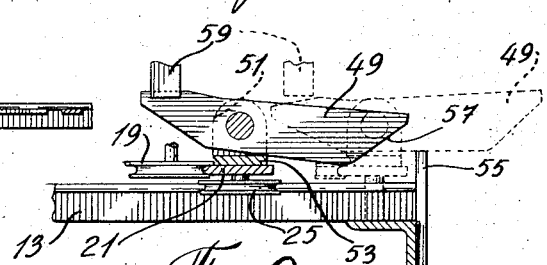
Fig. 9
INVENTOR
Joseph O. POISSON
BY
ATTORNEYS

United States Patent Office 3,340,820
Patented Sept. 12, 1967

3,340,820
CONVEYOR SYSTEM
Joseph O. Poisson, Victoriaville, Quebec, Canada, assignor to Victoriaville Furniture Limited, Victoriaville, Quebec, Canada
Filed May 13, 1965, Ser. No. 455,482
11 Claims. (Cl. 104—48)

ABSTRACT OF THE DISCLOSURE

A conveyor system formed of a first and second trackways meeting at an angle and a first and a second carrier mounted for movement on the corresponding trackway. Once the first carrier leaves its own trackways, it is carried by the second carrier. A conveyor belt is provided beneath the first and the second trackways and includes a guiding wheel at the junction of the two trackways. The first carrier is connected to the belt by means of a pin so located in relation to the first carrier that the latter has completely left the first trackway before the pin starts winding around the guiding wheel.

---

The present invention relates to a conveyor system and more particularly to a conveyor for stacked veneer panels or the like sheet material, said conveyor involving a relatively abrupt change of direction.

It will be appreciated that such a conveyor in the case of stacked veneer panels must be smooth in operation particularly at the turn thereof whereby to prevent upsetting of the panel stack. The conveyor must also have a speed which is adequate and consistent with the requirements of production. Such angular conveyors are known today but they are manually operated and require the continuous attendance of a workman which, of course, increases the cost of manufacturing the panels. Other conveyors of this general nature have also been proposed but none have been found particularly adapted to provide the required function and features above-mentioned.

It is pointed out that a conveyor as contemplated by the invention is useful, for instance, in the case of a veneer splicing machine where panels are built up from strips and are returned to the machine operator for the splicing of a new strip until the required width is obtained. The conveyor must therefore receive the panels at one end and when a sufficient stack is built, it must be driven to the operator's station, that is, after having turned at least one angle which is usually a right angle.

It is consequently an object of the invention to provide such an angular conveying system for the conveying of sheets of material which are of light weight and usually wider than the said conveyor and thus prone to easily tip over if not adequately handled, the handling by the conveyor being completely automatic.

Another important object of the invention lies in the provision of such an angular conveyor that is quite simple in structure whereby it may be manufactured at low cost to thus reduce the overall manufacturing cost to a minimum while being easily repaired, if need be.

The above objects of the invention are obtained in a conveyor system which comprises a first and a second trackway that meet at an angle; a first and a second carrier mounted for movement on and axially of the first and second trackways, respectively; guide means on the second carrier for guiding the first carrier when the latter leaves the first trackway and the second carrier is at the junction of the trackways whereby the first carrier is then carried by the second carrier; a travelling belt beneath the first and second trackways and a guiding wheel around which the belt is trained as it travels from one trackway to the other; means connecting the belt to the first carrier to cause displacement thereof, the wheel being so located as to cause winding of the connecting means only after the first carrier has completely left the first trackway.

A feature which is important with the invention and which will be referred to in more details hereinafter, lies in that the second carrier is connected to the belt, to be driven thereby, and smoothly winds around the guiding wheel thus causing the said second carrier to only gradually take on the direction of the second trackway.

Auxiliary features of the invention comprise a first locking means holding the first and second carriers when in engagement one over the other when the two travel along the second trackway to prevent undue swaying of the second carrier relative to the first. Another locking means is also provided which automatically locks the second carrier in the continuation of the first trackway when at the junction of the two trackways and is released as soon as the two carriers start to travel together.

It is believed that a better understanding of the invention will be afforded by the description that follows of a specific embodiment thereof having reference to the appended drawings, wherein:

FIGS. 2, 3, 4, 5 and 6 are plan views of portions of the trackways of the conveyor at the junction thereof to illustrate various positions of the two carriers;

FIG. 7 is a front elevation view of part of the first carrier to show the coupling thereof to the driving belt;

FIG. 8 is a perspective view, in full lines and in shadow lines, of the mechanism for locking the two carriers together;

FIG. 9 is a side elevation view of a portion of the conveyor intended to illustrate the carrier locking mechanism in actuation;

FIG. 10 is a perspective view of a portion of the conveyor of the invention intended to illustrate the locking latch mechanism for locking the second conveyor relatively to the first trackway;

FIG. 11 is a perspective view of the carrier unlocking mechanism of the second carrier.

Figure 1:
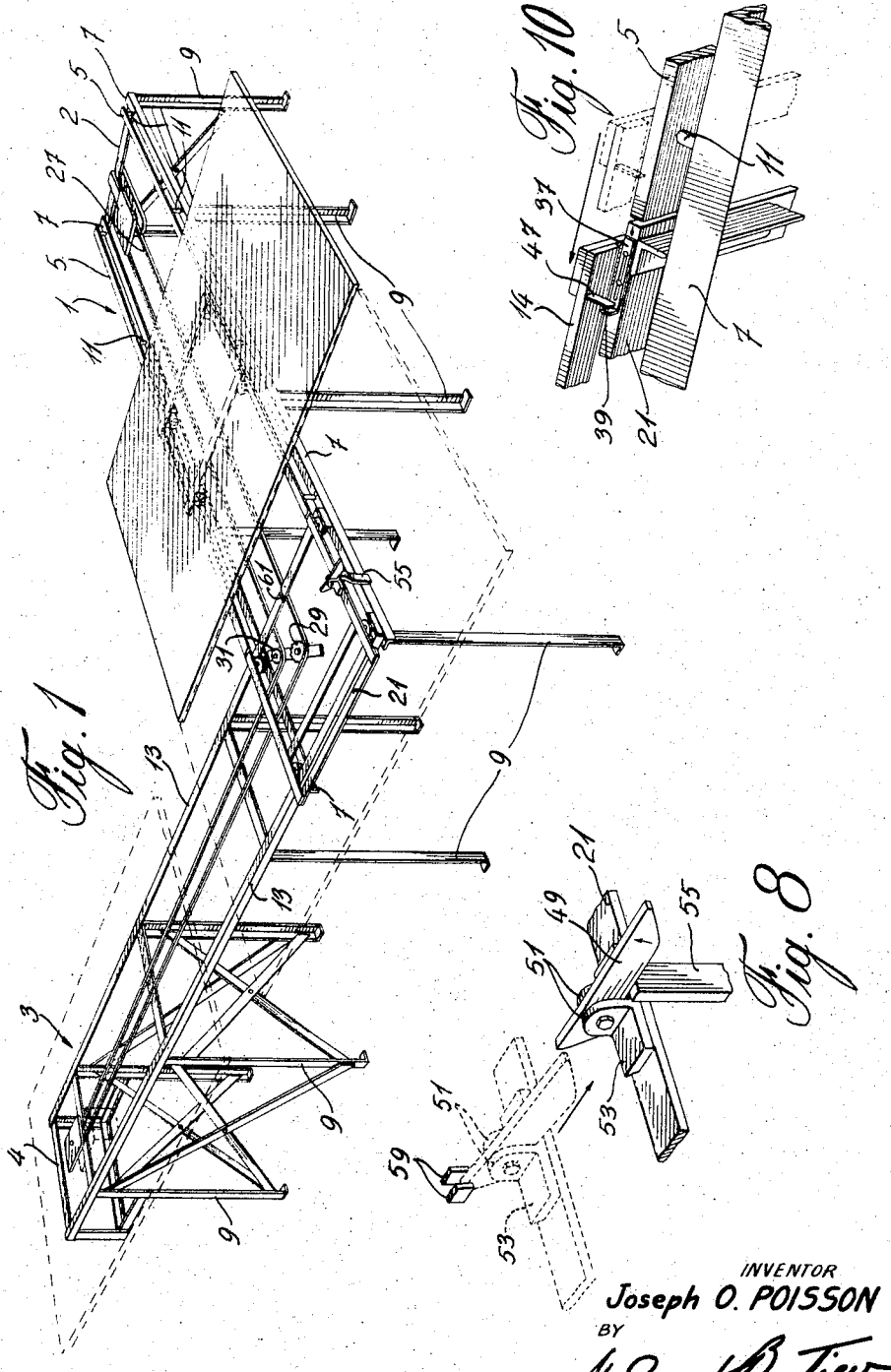
FIG. 1 is a perspective view of the angular conveyor of the invention.

With particular reference to FIG. 1, the invention comprises a first trackway 1 having a loading end 2 and meeting a second trackway 3 having a discharging end 4. The two trackways meet along the outer ends thereof with a lateral edge of trackway 3 in overlapping engagement with the frontal end of first trackway 1. The junction will usually, although not necessarily so, be at 90°.

Trackway 1 is formed with lateral guiding means in the form of rails 5 supported in space relationship on the edges 7 of a supporting table carried by a series of vertical legs 9. Rails 5 are held on table edges 7 by means of a series of small posts 11 or any other suitable means.

It will be noted that while the rails 5 terminate short of trackway 3, the edges 7 of the table extend in the passage of the said trackway 3.

The second trackway is built in a similar manner and comprises carrier guiding means in the form of a pair of lateral rails 13 also mounted on legs 9 or other similar supporting leg structure each as that shown at the discharging end 4 of trackway 3. The junction ends of rails 13 are secured over the table edges 7 of the first conveyor 1. As such, it will be noted that the level of the top surface of rails 13 is lower than the corresponding level of the rails 5 of trackway 1.

A first carrier, best illustrated in FIGS. 2 through 6, is composed of a rectangular frame 15 diagonally stiffened by means of braces 17 preferably meeting at the center of the rectangular frame 15. This frame is provided, beneath two parallel side members, with rolling means for the displacement of the carrier, the rolling means illustrated being in the form of four sheaves 19 mounted for free rotation about axes normal to frame 15 and so disposed thereon as to have their circumferential groove in engagement with the facing edges of rails 5.

Figure 2:
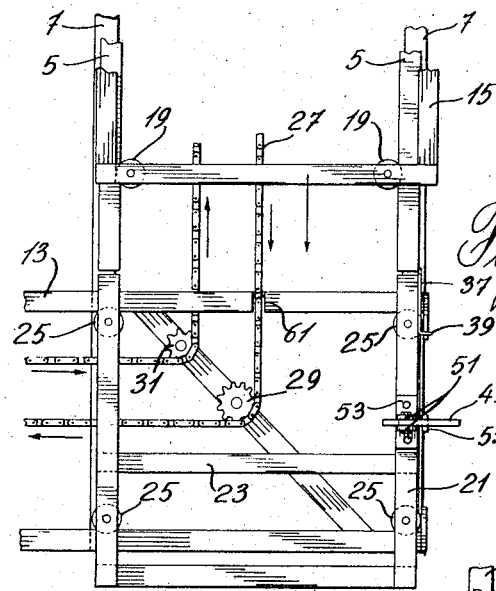

A second carrier, adapted to travel on trackway 3 is built in a similar manner and comprises a frame 21 which, however, is opened along the side facing trackway 1 when in the position shown in FIG. 2. A transverse stiffener member 23 or other stiffening structure may be used to prevent the second carrier 21 from collapsing. The location of the stiffening structure will be referred to again hereinafter.

Frame 21 is provided, in the manner similar to frame 15, with rolling means 4, for its displacement in the form of four sheaves 25, the peripheral groove thereof being mounted in engagement with rails 13 of trackway 3. With reference to FIG. 2, an important feature of this invention resides in that the lateral members of frame 21 are at the same level as rails 5 of trackway 1. Furthermore, when located at the junction of the two trackways, as in FIG. 2, the side members of rectangular frame 21 are in alignment with rails 5 so that the first carrier may be driven over the second carrier since the sheaves 19 can leave the edges of rails 5 to move and engage with the edges of the lateral members of frame 21.

For convenience, frames 15 and 21 will hereinafter be respectively referred to as first carrier 15 and second carrier 21.

Motor power for the conveyor is provided by means of the driving belt 27 having a strand located, preferably although not necessarily, centrally of trackways 1 and 3. The return strand may be located adjacent the inner periphery of the conveyor. Belt 27 lies below table edges 7 and rails 13.

The central strand of belt 27 winds, at the center, around a wheel 29 and at each end of the trackways around suitable pulleys (not shown) one of which is a driving pulley. The peripheral strand winds around a wheel 31 also located at the junction of the two trackways.

In the preferred form of the invention, belt 27 is a sprocket chain and wheels 29 and 31 are consequently sprocket wheels.

As best shown in FIG. 7, first carrier 15 has a pin 33 connected at one end at the junction of bracing members 17 and at the other end to the driving belt or sprocket chain 27. At that end, pin 33 may serve as a rivet for connecting two adjacent links together. In this manner, it will be understood that travelling of sprocket chain 27 causes similar displacement of the first carrier 15.

At the start of the operation, when first carrier 15 is at the loading end 2 of trackway 1, second carrier 21 is at the junction of the two trackways and in the position shown in FIG. 2. It is also held in that position by means of an L-shaped locking latch 35 (see FIGS. 10 and 11) having a locking arm 37 and a releasing arm 39 at right angles thereto. The locking arm 37 is formed with an elongated slot 41 through which extends a pair of rivets 42 secured to the lateral edge of the second carrier 21. Rivets 42 are so mounted to allow free displacement of locking latch 35 so that the latter may be displaced with the locking arm 37 in and out of engagement with the adjacent rail 5 of trackway 1 in a manner easily understood from a study of FIGS. 10 and 11.

A return spring 43 has one end secured to releasing finger 39 while the other end is secured to a pin 45 projecting from one of the rivets 42. By this description, it will be understood that locking latch 35 is constantly biased into engagement with rail 5.

An actuating lug 47 (see FIGS. 10 and 11) is provided on first carrier 15 to depend from the lower surface thereof and near the rearward end in relation to the loading end 2 of trackway 1.

By the above description, and with reference to FIGS. 10 and 11, it will be understood that as carrier 15 is driven toward trackway 3 and engages over second carrier 21, it eventually engages with the releasing finger 39 to drive it against spring 43 and disengage the locking arm 37 from the edge of the adjoining rails 5 to thus free both carriers 15 and 21 for displacement along trackway 3. It should be noted that disengagement of locking arm 37 preferably takes place only when first carrier 15 is fully over the second carrier 21.

Figure 3:
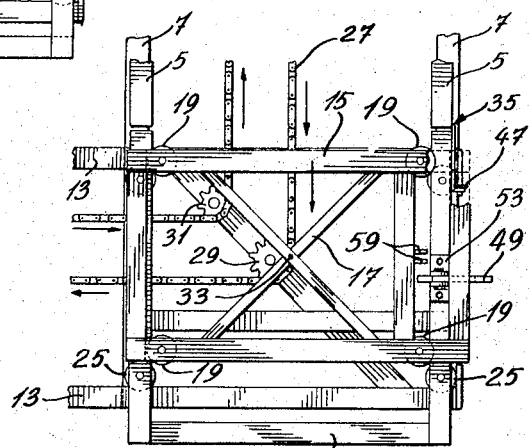

When carriers 15 and 21 are in engagement one over the other as is the case in FIG. 3, it will be noted that the engagement of sheaves 19 on the lateral members of carrier 21 prevent displacement of the first carrier 15 in the direction of the longitudinal axis of trackway 3 except when driven along with carrier 21 as will hereinafter be described.

Second carrier 15 must now be secured against displacement in a direction parallel to the longitudinal axis of trackway 1 or transverse to trackway 3 to prevent the stack of panels from swaying back and forth laterally and possibly tip over.

A second locking means is therefore proposed to retain second carrier 15 from such displacement, this locking means being illustrated in FIGS. 8 and 9.

It will be seen to consist in the provision of a weighted locking bar 49 pivotally mounted on a pair of spaced lugs 51 upwardly projecting from a plate 53 secured over the surface of the second carrier 21. The mounting should be such however that locking bar 49 will not interfere with the displacement of carrier 15 over carrier 21 when it is in horizontal position. For this purpose, a lever 55 is provided on the edge 7 of the table of trackway 1 at the extreme end of trackway 3 (see FIG. 1), the said lever 55 projecting above rail 5 a distance such that when carrier 21 is locked at the junction of the two trackways by the locking latch 35, the locking bar 49 is in horizontal position as shown in shadow lines in FIG. 9. For this purpose, the rear end of the locking bar 49 is steeply inclined as at 57 to cause pivoting thereof when the top of lever 55 rides on the incline 57.

A pair of spaced lugs 59 is provided on one lateral member of carrier 15 and so located thereon as to be positioned on either side of lever 55 when first carrier 15 is fully over second carrier 21 as in FIG. 5.

As best seen in FIGS. 1 and 2, the extreme end of the inner rail 13 of trackway 1 at the junction of the trackways is slitted as at 61 for the passage of pin 33 of the driving mechanim.

The operation of the device of the invention will now be made having reference to FIGS. 2 through 6.

In FIG. 2, carrier 15 is driven toward the junction and still rides on rails 5 of trackway 1. In FIG. 3, carrier 15 has been moved over second carrier 21 and it will be noted that driving pin 33 is about to reach the periphery of sprocket wheel 29. At that moment, actuating lug 47 abuts the releasing finger 39 of the locking latch 35 and stands ready to unlock the second carrier 21.

Figure 4:
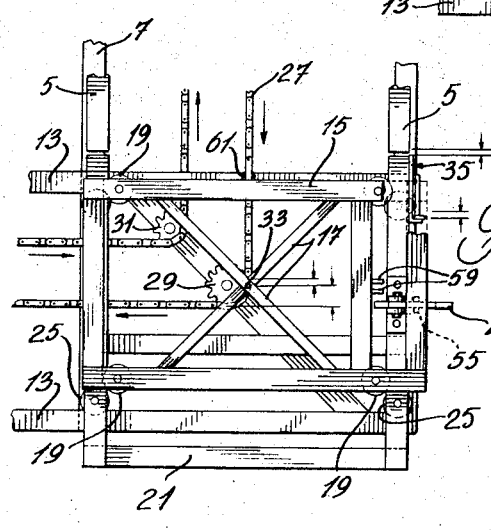

In FIG. 4, pin 33 has moved into engagement at the periphery of sprocket wheel 29 and latch 35 has moved sufficiently to release carrier 21 from adjacent rail 5. In that position, carrier 15 is fully on carrier 21 and both are ready to move in the longitudinal direction of trackway 3. It will be noted that during all that time, lugs 59 of carrier 15 keep on approaching locking lever 49.

In the position of FIG. 5, driving pin 33 has moved still further around the sprocket wheel 29 and is about to leave it. At that very moment, lugs 59 are immediately on either side of locking lever 49.

Of course, as soon as pin 33 has started to wind around sprocket wheel 29, the two carriers have started to move in the direction of trackway 3 but the length of the weighted lever 49 (FIG. 9 in dotted lines) is sufficiently long to still be retained horizontal by lever 55 and out of engagement with lugs 59.

As driving pin 33 leaves the periphery of sprocket wheel 29, locking bar 49 is no longer retained by lever 55 so that its unbalance drives it clockwise with the forward end thereof projecting upwardly between the two lugs 59 of frame 15. The two frames 15 and 21 thus become locked together in regard to transverse displacement relative to trackway 3.

Although a specific embodiment of the invention has just been described, it will be understood that various modifications may be made thereto without departing from the spirit of the invention, the scope of which is set forth in the appended claims.

I claim:
1. A conveyor system comprising:
   (a) first and second trackways meeting at an angle;
   (b) a first carrier mounted for movement on and axially of said first trackway;
   (c) a second carrier mounted for movement on and axially of said second trackway;
   (d) guide means on said second carrier for guiding said first carrier when the latter leaves said first trackway and said second carrier is at the junction of said trackways whereby said first carrier is then carried by said second carrier;
   (e) a travelling belt beneath said first and second trackways;
   (f) a guiding wheel around which said belt is trained as it changes from one trackway to the other;
   (g) means connecting said belt to said first carrier to cause displacement thereof;
   (h) said wheel so located as to cause winding of said connecting means only after said first carrier has completely left said first trackway.

2. A conveyor system comprising:
   (a) a first trackway having first carrier guiding means;
   (b) a second trackway having second carrier guiding means joining said first guiding means at an angle and at a lower elevation;
   (c) a first carrier for mounting on said first trackway for guided movement in said first guiding means;
   (d) a second carrier mounted on said second trackway for guided movement in said second guiding means;
   (e) guide means on said second carrier formed to become a continuation of said first guiding means whereby said first carrier may be moved from said first guiding means onto said second carrier in engagement with said guide means when said second carrier is at the junction of said trackways;
   (f) a travelling belt beneath said first and second trackways;
   (g) a guiding wheel around which said belt is trained as it moves from one trackway to the other;
   (h) means conecting said belt to said first carrier to cause displacement thereof;
   (i) said wheel so located as to cause winding of said belt connecting means only after said first carrier has completely left said first trackway.

3. A conveyor system as claimed in claim 2, including cooperating locking means on said carriers to prevent lateral swaying of said first carrier when engaged over said second carrier.

4. A conveyor system as claimed in claim 2, including cooperating releasable locking means on said carriers and first trackway to lock said second carrier to said first trackway and releasable upon said first carrier being engaged over said second carrier.

5. A conveyor system comprising:
   (a) a first trackway having a pair of first lateral straight guiding tracks;
   (b) a second trackway having a pair of second lateral straight guiding tracks edgedly at one end of said first trackway at an angle thereto and at a lower elevation;
   (c) a first carrier for mounting over said first trackway and having rolling means guidingly engageable on said first guiding tracks;
   (d) a second carrier mounted over said second trackway and having rolling means guidingly engageable on said second guiding tracks;
   (e) a pair of guide rails on said second carrier extending in the same direction and at the same level as said first guiding tracks and having the same spacing whereby, when said second carrier is at the junction of said trackways with said rails aligned with said first guiding rails, said first carrier may be transferred from said first trackway to and over said second carrier and vice-versa;
   (f) a travelling belt beneath said first and second trackways;
   (g) a guiding wheel around which said belt is trained as it moves from one trackway to the other;
   (h) means connecting said belt to said first carrier to cause displacement thereof;
   (i) said wheel so located as to cause winding of said belt connecting means only after said first carrier has completely left said first trackway.

6. A conveyor system comprising:
   (a) a first trackway having a pair of first lateral straight guiding tracks;
   (b) a second trackway having a pair of second lateral straight guiding tracks edgedly at one end of said first trackway at an angle thereto and at a lower elevation;
   (c) a first carrier for mounting over said first trackway and having rolling means guidingly engageable on said first guiding tracks;
   (d) a second carrier mounted over said second trackway and having rolling means guidingly engageable on said second guiding tracks;
   (e) a pair of guide rails on said second carrier extending in the same direction and at the same level as said first guiding tracks whereby, when said second carrier is at the junction of said trackways with said rails aligned with said first guiding rails, said first carrier may be transferred from said first trackway to and over said second carrier and vice-versa;
   (f) a travelling sprocket chain mounted beneath said first and second trackways;
   (g) a guiding sprocket wheel around which said chain is trained as it changes from one trackway to the other;
   (h) a pin secured at one end to said first carrier and at the other end to the sprocket chain whereby travel of said chain causes displacement of said first carrier;
   (i) said wheel so located as to cause winding of said pin only after said first carrier has completely left said first trackway.

7. A conveyor system as claimed in claim 6, including cooperating locking means on said carriers to prevent swaying of said first carrier when engaged over said second carrier.

8. A conveyor system as claimed in claim 7, wherein said cooperating locking means comprises:
   a pair of spaced lugs on said first carrier;
   a pivotally weighted locking bar on said second carrier at a lower level than said lugs;
   means on said second trackway to retain said locking bar in horizontal position when said second carrier is at said junction and to release said bar when said second carrier moves away from said junction and allow one end of said bar to move upwardly into engagement between said lugs;
   said lugs so located on said first carrier as to receive said locking bar end therebetween when said locking bar is released.

9. A conveyor system as claimed in claim 6, including cooperating releasable locking means on said carriers and first trackway to lock said second carrier to said first trackway and releasable upon said first carrier being engaged over said second carrier.

10. A conveyor system as claimed in claim 9, wherein said cooperating locking means comprises:
- a locking latch mounted on said second carrier and movable longitudinally of said first trackway to engage said first trackway and prevent movement of said second carrier from said junction;
- resilient means biasing said latch into locked position, and
- a releasing member projecting from said first carrier to engage said latch and move it against said resilient means when said first carrier has moved free of said first trackway.

11. A conveyor system as claimed in claim 6, wherein said guiding tracks have straight edges and said rolling means are sheaves engageable with said edges.

References Cited

UNITED STATES PATENTS

| | | | |
|---|---|---|---|
| 2,919,657 | 1/1960 | Wack | 104—48 |
| 2,976,817 | 3/1961 | Stapp | 104—48 |
| 3,021,795 | 2/1962 | Hayba | 104—48 |

ARTHUR L. LA POINT, *Primary Examiner.*

D. F. WORTH, *Assistant Examiner.*